(12) United States Patent
Kimura et al.

(10) Patent No.: US 9,225,213 B2
(45) Date of Patent: Dec. 29, 2015

(54) ELECTRICAL ROTATING MACHINE

(71) Applicant: Hitachi, Ltd., Tokyo (JP)

(72) Inventors: Mamoru Kimura, Hitachinaka (JP); Akiyoshi Komura, Hitachi (JP); Daisuke Kori, Hitachinaka (JP); Tetsuo Fujigaki, Hitachi (JP); Motonobu Iizuka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 13/928,471

(22) Filed: Jun. 27, 2013

(65) Prior Publication Data

US 2014/0001912 A1    Jan. 2, 2014

(30) Foreign Application Priority Data

Jun. 29, 2012 (JP) ................................. 2012-146285

(51) Int. Cl.
| | |
|---|---|
| H02K 1/00 | (2006.01) |
| H02K 3/04 | (2006.01) |
| H02K 1/27 | (2006.01) |
| H02K 1/22 | (2006.01) |

(52) U.S. Cl.
CPC ................ *H02K 3/04* (2013.01); *H02K 1/2766* (2013.01); *H02K 1/223* (2013.01); *Y02E 10/725* (2013.01)

(58) Field of Classification Search
CPC ....... H02K 3/04; H02K 1/233; H02K 1/2766; Y02E 10/725

USPC ................ 310/182, 210–211, 156.78–156.84
See application file for complete search history.

(56) References Cited

U.S. PATENT DOCUMENTS

| | | | | |
|---|---|---|---|---|
| 4,139,790 | A * | 2/1979 | Steen ........................ | 310/156.83 |
| 4,568,846 | A * | 2/1986 | Kapadia .................... | 310/156.83 |
| 5,097,166 | A * | 3/1992 | Mikulic .................... | 310/156.83 |
| 6,737,783 | B2 * | 5/2004 | Yanashima et al. ........... | 310/211 |
| 6,844,652 | B1 * | 1/2005 | Chu et al. ................ | 310/216.097 |

FOREIGN PATENT DOCUMENTS

JP          2001-314051 A      11/2001

* cited by examiner

*Primary Examiner* — Thanh Lam
(74) *Attorney, Agent, or Firm* — Volpe and Koenig, P.C.

(57) ABSTRACT

An electrical rotating machine includes: a rotating shaft; a rotor, equipped with permanent magnets, and formed to rotate with the rotating shaft, a stator disposed in opposition on an outside-diametral side and via a clearance with respect to the rotor; and anti-demagnetization conductors extending in the axial direction of the shaft, the conductors each being disposed inside the rotor, wherein: the anti-demagnetization conductors are provided in pairs of two for each of magnetic poles of the rotor; the two anti-demagnetization conductors forming a pair are electrically interconnected; and, inside the rotor, the two paired anti-demagnetization conductors are disposed at different-polarity sides of two corresponding permanent magnets in a circumferential direction of the rotor, the different-polarity sides each being more adjacent to the circumferential direction of the rotor than to an end portion of one of the two corresponding permanent magnets existing close to each other in one magnetic pole.

21 Claims, 5 Drawing Sheets

ELECTRICAL ROTATING MACHINE

BACKGROUND OF THE INVENTION

1. Field of the Invention

The present invention relates generally to electrical rotating machines in which permanent magnets are applied to a rotor. More particularly, the invention relates to a technique for preventing demagnetization of permanent magnets.

2. Description of the Related Art

In recent years, there are increasing cases of using permanent magnets in such electrical rotating machines as motors and generators. The types of permanent magnets used more commonly have also been shifting from ferrite magnets to neodymium magnets or other higher-performance permanent magnets that contain rare-earth elements. In particular, heavy rare earths such as dysprosium (hereinafter, abbreviated to Dy) improve the coercivities of neodymium magnets and are therefore a necessary element in the permanent-magnet electrical rotating machines that require environmental resistance. When the coercivity of a permanent magnet is improved, the irreversible demagnetization point at which the performance of the permanent magnet decreases can be moved to a higher-temperature side and a stronger electric field side, the characteristic of which enables a permanent-magnet electrical rotating machine to be not only operated at high temperatures of 100° C. or more, but also operated without becoming demagnetized even if an opposing magnetic field caused by sudden short-circuiting or other accidental events is applied.

However, since rare-earth elements are relatively scarce in the amount of presence on the earth, particularly since heavy rare earths, including Dy, are rare metals yielded only in limited districts, reduction in the usage amounts of these elements is a crucial factor in cost reduction of permanent-magnet electrical rotating machines.

The electrical rotating machines in which permanent magnets are used include, for example, the one described in JP-2001-314051-A listed below. The electrical rotating machine described in JP-2001-314051-A employs a rotor structure of a permanent-magnet synchronous motor, in which rotor structure, dampers equivalent to conductors commonly called squirrel-cage rotor conductors are constructed by providing the conductors in damper slots formed at equal intervals in a circumferential direction of a rotor, inclusive of pole centers. At a position between magnetic poles of different polarities in the rotor, a damper slot into which an auxiliary permanent magnet can be inserted is formed on the same circumference as that of each damper. For improved pull-out torque and pull-in torque characteristics of the motor, magnetic flux densities of each pole of the rotor are increased by inserting auxiliary permanent magnets into the damper slots positioned between the poles of different polarities.

SUMMARY OF THE INVENTION

Referring back to the electrical rotating machines that prevent the demagnetization of permanent magnets, it is desired that while the demagnetization of the permanent magnets is to be achieved, the original output function of the rotating machine be reduced to its minimum. The magnetic pole centers are each a region through which the principal magnetic fluxes needed to ensure output between the rotor and the stator pass through, so if permitted, from a perspective of maintaining output the conductors that obstruct the passage of the magnetic fluxes should not be arranged in the pole centers as far as possible.

The role that the squirrel-cage rotor conductors in JP-2001-314051-A is to play, on the other hand, is as described below. At rotor speeds from the start of rotation (machine operation) to the establishment of synchronization between the power frequency and the frequency of the magnetic fluxes formed by the permanent magnets of the rotor, the rotor cannot appropriately accelerate since the frequency of the power-on magnetic fluxes which the stator disposed at the radially outward side of the rotor forms does not match the frequency of the magnetic fluxes which the rotor will form as it rotates. Until a synchronous speed has been reached, therefore, current will flow into the squirrel-cage conductors disposed between the permanent magnets in the rotor and the stator windings in the stator, thus enabling the rotor to accelerate to the synchronous speed. If the squirrel-cage conductors are not arranged at equal intervals in the circumferential direction of the rotor, the magnetic fluxes that the squirrel-cage conductors form will be nonuniform, which will then cause the rotor to abruptly accelerate in some regions and weaken acceleration in some regions, resulting in unsmooth acceleration. This means that the squirrel-cage conductors that undertake the role of assisting the rotating motion of the machine until the synchronous speed has been reached are required to be arranged at equal intervals in the circumferential direction of the rotor as far as possible.

According to JP-2001-314051-A, the squirrel-cage conductors aiming at assisting the rotating motion during the start of operation are formed by providing these conductors in the damper slots formed at equal intervals in the circumferential direction of the rotor, inclusive of the pole centers. That is to say, the purpose itself of the forming the squirrel-cage conductors in JP-2001-314051-A is to assist the rotating motion until the synchronous speed has been reached, not to prevent demagnetization.

It is therefore an object of the present invention to provide an electrical rotating machine that minimizes a decrease in output while improving demagnetization resistance of permanent magnets.

In order to solve the foregoing problems, an electrical rotating machine according to an aspect of the present invention includes: a rotating shaft, a rotor formed to rotate with rotation of the rotating shaft, the rotor being equipped with permanent magnets; a stator disposed in opposed form on an outside-diametral side of the rotor via a clearance with respect to the rotor; and anti-demagnetization conductors extending in the axial direction of the rotating shaft, the conductors each being disposed inside the rotor, wherein: the anti-demagnetization conductors are provided in pairs of two for each of magnetic poles of the rotor; the two anti-demagnetization conductors forming a pair are electrically interconnected; and, inside the rotor, the two paired anti-demagnetization conductors are disposed at different-polarity sides of two corresponding permanent magnets in the rotor, the different-polarity sides each being more adjacent to an outer circumference of the rotor than to an end portion of one of the two corresponding permanent magnets existing close to each other in one magnetic pole.

In accordance with the present invention, an electrical rotating machine that minimizes a decrease in output while improving demagnetization resistance of permanent magnets can be provided.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENT

Hereunder, an embodiment preferred for implementing the present invention will be described using the accompanying drawings. The following description relates merely to a mode of implementation and is not intended in any way to limit application of the invention to the mode of implementation described. The invention may be modified into various modes other than the embodiment described below.

(Preferred Embodiment)

Figure 1:
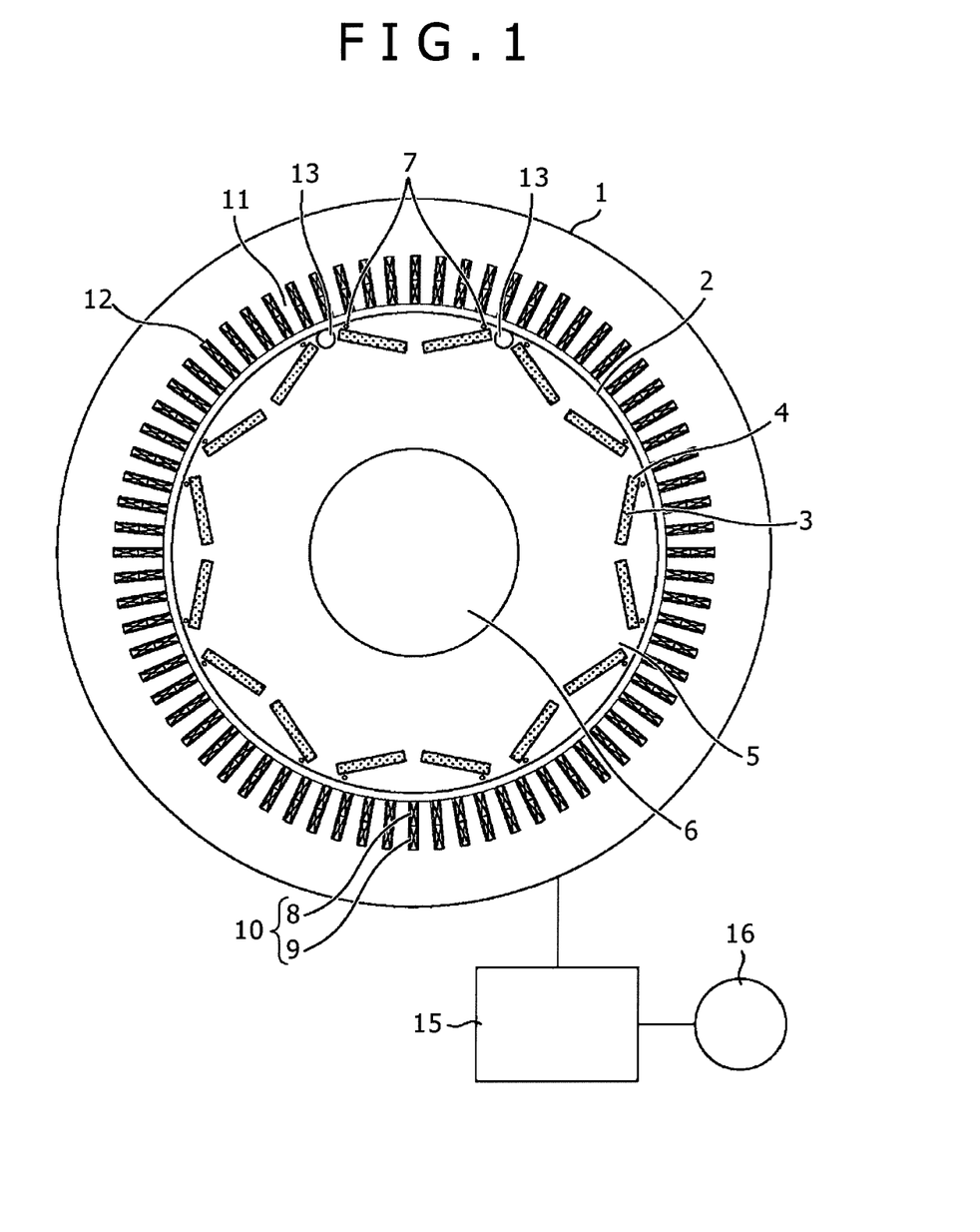
FIG. 1 is a sectional view showing a section of an electrical rotating machine according to an embodiment of the present invention, the section being perpendicular to an axial direction of the machine.

The preferred embodiment is described below using the accompanying drawings. A permanent-magnet electrical rotating machine having a capacity primarily from several hundreds of kilowatts (kW) inclusive to several tens of megawatts (MW) inclusive is described as the present embodiment. As shown in FIG. 1, the permanent-magnet electrical rotating machine according to the present embodiment is composed primarily of three elements: a shaft 6, which serves as a rotating shaft; a rotor 2, which is formed to rotate with rotation of the shaft 6 and equipped with permanent magnets 3; and a stator 1, which is provided with a clearance with respect to the rotor 2 and in opposed form on an outside-diametral side of the rotor 2.

The stator 1 is a distributed-winding stator with coils 10 wound in distributed fashion as stator windings around stator teeth 11, the distributed windings being continuous in a circumferential direction of the rotor. The coils 10 each have three-phase (UVW) windings. A structure in which eight magnetic poles are formed with 72 slots is described by way of example in the present embodiment. Each coil 10 includes an upper coil 8 and a lower coil 9, in one stator slot 12 between two stator teeth 11. While the present embodiment is described taking the distributed-winding stator as an example, the invention is of course not limited to the distributed-winding form and can incorporate other winding forms instead. The other winding forms here include, for example, concentrated winding in which coils are wound concentratedly around stator teeth. Electric power that has been supplied from a power supply 16 to a power-conditioning system 15 and then converted into an AC frequency required for synchronous machine operation is supplied to the coil 10 via a terminal provided at an axial end portion of the rotor or in an axially central section thereof.

The rotor 2, connected to the shaft 6, includes a rotor core 5 laminated in an axial direction of the shaft 6, and the permanent magnets 3 arranged inside magnet insertion holes 4 provided on an outside-diametral side of the rotor core interior. The rotor will rotate as the shaft 6 rotates. On the rotor core 5, one pair of anti-demagnetization conductors 7 are further arranged for one magnetic pole. The anti-demagnetization conductors 7 are arranged in different-polarity interpolar sections at both sides of each conductor pair in the rotor 2, and are not arranged at any regions other than the different-polarity interpolar sections in the rotor 2. Each different-polarity interpolar section here refers to such a region as will satisfy a relationship of 0.6<WB/WM<1.4 described later herein when the anti-demagnetization conductors 7 are arranged in the rotor. The anti-demagnetization conductors 7 are each desirably formed from an electrically conductive material, for example, copper or aluminum. The two anti-demagnetization conductors 7 forming one pair for one magnetic pole are electrically connected to each other at an axial end portion of the rotor 2. For example, all anti-demagnetization conductors 7 of the rotor 2 may be interconnected using copper or other electrically conductive ring-like members or each pair of anti-demagnetization conductors 7 may have the two conductors interconnected for one pole independently. In the present embodiment, the permanent magnets 3 formed in pairs of two for one pole are arranged in V-form so that sides of the same polarity face each other. Naturally, the layout of the permanent magnets is not limited to the V-form arrangement and one or three magnets or more may be originally arranged for one pole or the magnets may be arranged in arc form. Briefly the layout of the permanent magnets can take various forms and shapes.

Figure 2:
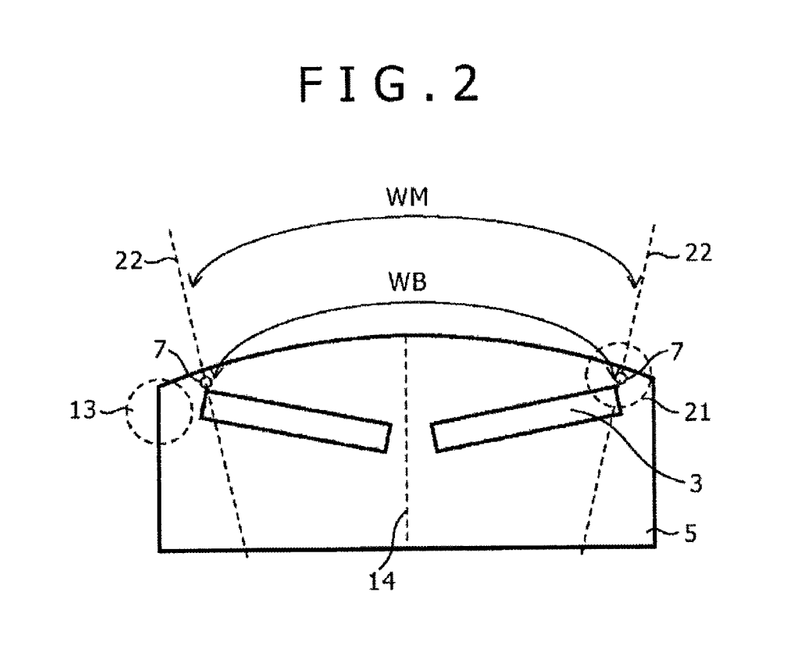
FIG. 2 is an enlarged view showing an example of a magnetic pole in a rotor according to the embodiment.

An enlarged view of a one-pole section of the rotor 2 is shown in FIG. 2. As described above, the present embodiment employs the V-form of permanent magnet arrangement. In this case, sections of each permanent magnet 3 that are closer to the interpolar section 13 between magnetic poles are correspondingly closer to an outer circumferential side of the rotor, so the amount of iron core present at an outside-diametral side of the permanent magnet 3 is smaller than at an inside-diametral side thereof. Since magnetic fluxes arising from the permanent magnet will collectively pass through such a section in which the amount of core is small, magnetic flux saturation will occur in the section. The section of the permanent magnet 3 that is closer to the outer circumferential side of the rotor and small in the amount of core and where the magnetic flux saturation will occur, is shown as a minimal pole region 21. Referring to FIG. 2, a line 22 is drawn from a rotational center of the rotor, towards a region at which the outer circumference of the rotor 2 and an outer end portion of the permanent magnet 3 become closest to each other at the minimal pole region 21. When viewed on both sides from the rotational center of the rotor 2, those regions at which the outer circumference of the rotor 2 and the outer end portion of the permanent magnet 3 become closest to each other form an angle of circumference, WM, with respect to a line 14 passing from the rotational center of the rotor through a central section of the magnetic poles.

At both sides of the line 14 passing from the rotational center of the rotor through the central section of the magnetic poles, one anti-demagnetization conductor 7 is provided to form a pair, and an angle of circumference between the anti-demagnetization conductors 7 provided to form a pair for one pole when viewed from the rotational center of the rotor is shown as WB. Referring to FIG. 2, the anti-demagnetization conductors 7 are provided on the line 22 drawn from the rotational center towards the regions at which the outer circumference of the rotor 2 and the outer end portion of the permanent magnet 3 become closest to each other at the minimal pole region 21. More specifically, the anti-demagnetization conductors 7 are located further externally to the outer end portions of both permanent magnets 3, within the rotor core 5. That is to say, WB=WM holds in the example of FIG. 2.

Figure 3:
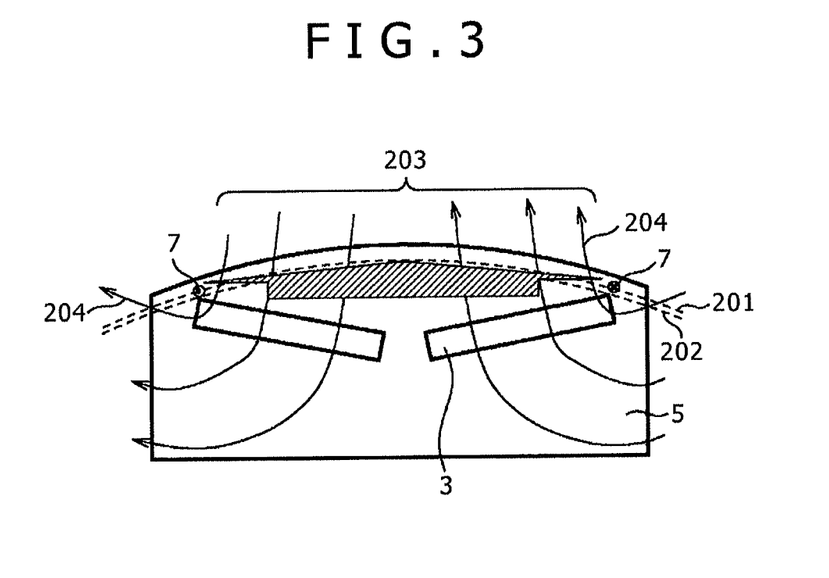
FIG. 3 is a diagram showing the way an opposing magnetic flux is applied and the way a magnetic flux counteracting an opposing magnetic field is generated.

Demagnetization of the permanent magnets is described below using FIG. 3. In the electrical rotating machine using the permanent magnets, it is necessary to first improve demagnetization resistance of each permanent magnet in order to prevent its magnetic force from decreasing. The demagnetization resistance of the permanent magnet is affected by route length of the magnetic fluxes passing through the permanent magnet. In case of sudden short-circuiting or other incidences, if an opposing magnetic field 203 is applied from the stator 1, in particular, a magnetic flux that passes only partially through the permanent magnet 3 occurs therein, as with a flux 204, and the magnetic flux that passes only partially through has a short route. The application of such an opposing magnetic flux having a short route in the permanent magnet reduces the demagnetization resistance of the magnet.

One possible way to increase the length of the route through the permanent magnet would be by thickening the magnet. Thickening will however increase the amount of permanent magnet used. To improve demagnetization resistance without thickening the permanent magnet, therefore, it is desired that the magnetic flux that passes only partially through the permanent magnet 3, as with a flux 204, should be prevented from acting upon the magnet 3.

In the present embodiment, the anti-demagnetization conductors 7 to become a pair are located further externally to the outer-circumferential side of the rotor 2, compared with an arc 202 connecting outer corners of the permanent magnets 3. In other words, an arc 201 connecting the anti-demagnetization conductors 7 along the outside-diametral side of the rotor core 5, across the line 14 passing from the rotational center of the rotor through the central section of the magnetic pole, has a radius (DD) greater than a radius (DM) of the arc 202 connecting the regions at which the outer circumference of the rotor 2 and the outer end portions of the permanent magnets 3 become closest to each other, along the outside-diametral side of the rotor core 5, across the line 14. Briefly, there is a relationship of DM<DD between both arcs.

When the anti-demagnetization conductors 7 are arranged under the above relationship, the opposing magnetic field 203 reaching the permanent magnets 3 will necessarily pass through at least one of the arc 201 connecting the anti-demagnetization conductors 7 along the outside-diametral side of the rotor core 5, and a line created by extending the arc 201 in the outer circumferential direction of the rotor 2. At this time, eddy currents will flow into the anti-demagnetization conductors 7 (one of the currents will flow into a front side of the left anti-demagnetization conductor 7 in FIG. 3, and the other current will flow into a rear side of the right anti-demagnetization conductor 7) and magnetic fluxes 204 will occur in a direction that renders the opposing magnetic field 203 weak. Thus the opposing magnetic field 203 will be weak and demagnetization resistance will improve.

Figure 4:
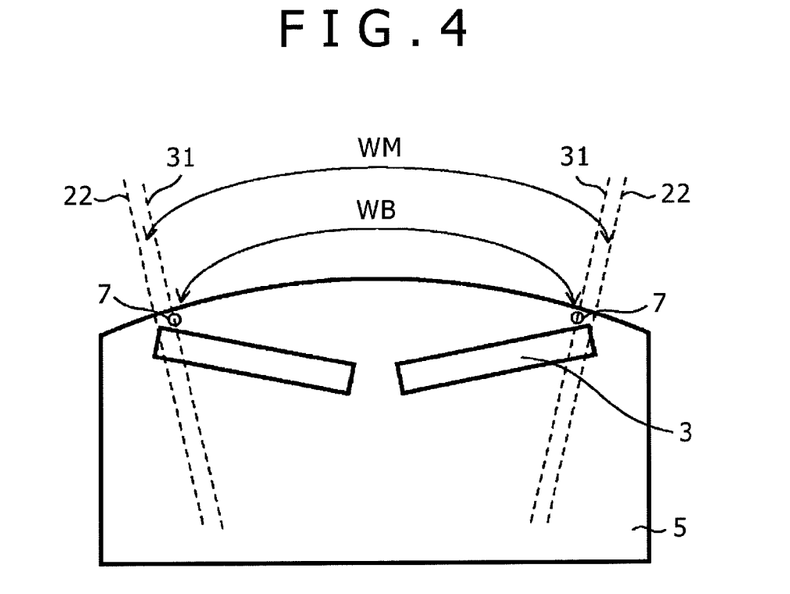
FIG. 4 is an enlarged view showing another example of a magnetic pole in a rotor.

In the present embodiment, the anti-demagnetization conductors 7 are, as shown in FIG. 2, provided on the line 22 drawn from the rotational center towards the regions at which the outer circumference of the rotor 2 and the outer end portions of the permanent magnets 3 become closest to each other at the minimal pole region 21. More specifically, the anti-demagnetization conductors 7 are located further externally to the outer end portions of both permanent magnets 3, within the rotor core 5. That is to say, WB=WM holds. The positions of the anti-demagnetization conductors 7, however, are not limited to the positions at which the relationship of WB=WM holds. For example, the anti-demagnetization conductors 7 may be positioned to establish a relationship of WB<WM as shown in FIG. 4, or conversely, the anti-demagnetization conductors 7 can be positioned to establish a relationship of WB>WM (not shown). The minimal pole region 21 is where the corners of the permanent magnets 3 are positioned. Hence, stresses due to centrifugal force of the magnets will be concentrated on this position, so for enhanced strength, a larger amount of core is preferably present at the minimal pole position 21, especially at where WB=WM. To be more specific, resistance to the stresses will improve if the anti-demagnetization conductors 7 are arranged at positions shifted (as shown by line 31) from the line 22 drawn from the rotational center of the rotor 2 towards the regions at which the outer circumference of the rotor 2 and the outer end portions of the permanent magnets 3 become closest to each other.

Figure 5:
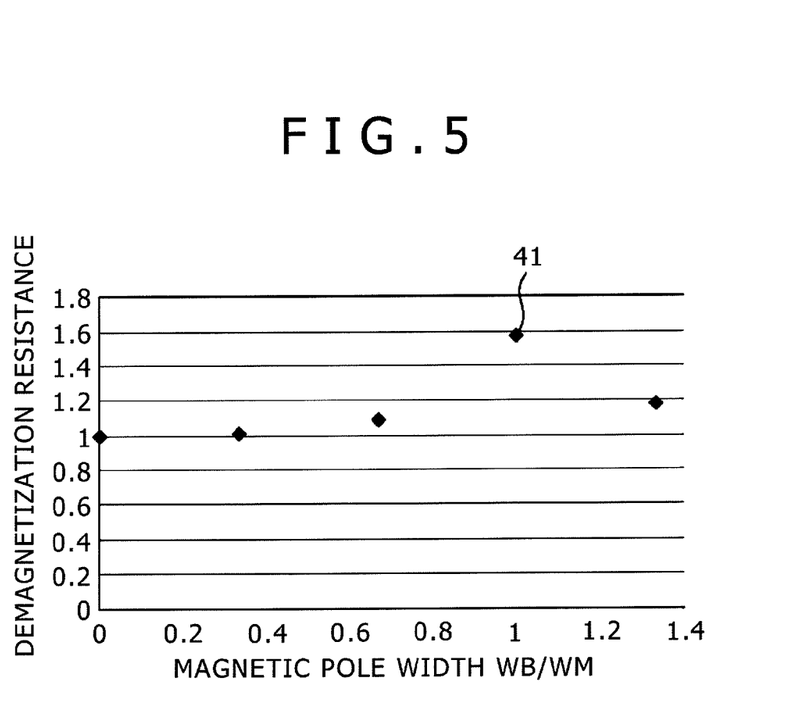
FIG. 5 is a diagram that shows changes in demagnetization resistance versus a ratio of an anti-demagnetization conductor layout interval and a magnetic-pole minimal layout interval.

FIG. 5 shows a relationship between demagnetization resistance and a ratio of magnetic pole width WB/WM, the relationship of FIG. 5 assuming that the demagnetization resistance obtained without an anti-demagnetization conductor 7 is taken as 1. At the region (different-polarity interpolar section) satisfying the relationship of 0.6<WB/WM<1.4, demagnetization resistance is well above its values obtained without an anti-demagnetization conductor 7, which indicates that a demagnetization resistance improvement effect is obtained. For this reason, the magnetic pole region WM and the anti-demagnetization conductor layout interval WB are desirably set to satisfy nearly 0.6<WB/WM<1.4. In addition, at regions other than WB/WM<0.6 or 1.4<WB/WM, the advantageous effect shown in FIG. 4 can be obtained, even if bars are arranged at somewhat unequal intervals on the rotor circumference, instead of being equally arranged for left-right symmetry for one pole.

In the present embodiment, the anti-demagnetization conductors 7 to form independent pairs for each magnetic pole of the rotor 2 are arranged so that the permanent magnets 3 are positioned further internally to at least one of the arc connecting the anti-demagnetization conductors 7 along the outside-diametral side of the rotor 2, and the line created by extending that arc in the outer circumferential direction of the rotor 2. Current will therefore flow into the anti-demagnetization conductors 7 to obstruct the opposing magnetic field and as a result, a weakened opposing magnetic field will be necessarily applied to the permanent magnets 3.

Even when the above-described relationships are not satisfied, however, if the anti-demagnetization conductors 7 are provided in pairs for each magnetic pole of the rotor 2 and these anti-demagnetization conductors 7 electrically interconnected are arranged in the different-polarity interpolar sections at both sides of each conductor pair in the rotor 2 and are not arranged at any regions other than the different-polarity interpolar sections in the rotor 2, then a decrease in output can be minimized while improving the demagnetization resistance of the permanent magnets 3. These can be attained because the anti-demagnetization conductors 7, although arranged at the different-polarity interpolar sections that contribute to demagnetization, are not arranged in any other sections that may lead to reduced output.

In the present embodiment, in particular, the power-conditioning system 15 is provided and the alternating current is supplied from the power-conditioning system 15 to the coils 10. In this case, it is beneficial to arrange the anti-demagnetization conductors 7, in particular, in the different-polarity interpolar sections at both sides and not to arrange anti-demagnetization conductors 7 at any regions other than the different-polarity interpolar sections in the rotor 2. The reasons for that are described in further detail below.

When the power-conditioning system is used, high-frequency magnetic fluxes synchronous with the power frequency are also generated in large quantities. In this case, if a conductor is disposed between any two magnets provided near a coil and inside the rotor, since the conductor will generate an induced current with respect to a magnetic flux linking the conductor itself, the induced current will in turn generate a magnetic field in the direction that the linking magnetic flux is counteracted. Consequently, the frequency that has been controlled using the power-conditioning system will not be applicable to the magnets exactly as planned. That is to say, when using the power-conditioning system, it is beneficial not to arrange anti-demagnetization conductors 7 at any regions other than the different-polarity interpolar sections in the rotor 2. At the different-polarity interpolar sections, on the other hand, high-frequency magnetic flux linking will not occur and the different-polarity interpolar sections will only respond to magnetic fluxes corresponding to the power frequency, with the result that energy will not be easily lost. Additionally, since the opposing magnetic flux that causes demagnetization is a flux due to the fact that the magnetic fluxes corresponding to the power frequency have worked in an reverse direction, it will be very suitable to arrange anti-demagnetization conductors 7 at the different-polarity interpolar sections, since the arrangement will generate the magnetic field that counteracts only the power frequency developing the opposed magnetic flux.

It has been described above that the anti-demagnetization conductors 7 are arranged at the different-polarity interpolar sections and not arranged at any other regions. However, disposing a further anti-demagnetization conductor 7 at a different-polarity side that is more adjacent to the circumference of the rotor 2 than to the end portion of the permanent magnet 3 proximate to the other permanent magnet 3 in the same magnetic pole region of the rotor 2 will be more or less effective for preventing demagnetization while minimizing a decrease in output. The above will also lead to reducing the usage amount of permanent magnet without increasing its thickness for improved demagnetization resistance. The above disposition, that is, disposing a further anti-demagnetization conductor 7 at the different-polarity side that is more adjacent to the circumference of the rotor 2 than to the end portion of the permanent magnet 3 proximate to the other permanent magnet 3 in the same magnetic pole region of the rotor 2 refers to disposing the further conductor 7 with a view to improving demagnetization resistance. In this case, when other adjacent poles are also viewed together, anti-demagnetization conductors 7 are, as shown in FIG. 1, nonuniformly distributed at the different-polarity sides that are more adjacent to the circumference of the rotor 2 than to each permanent magnet 3, compared with a position closer to the pole center side than to the permanent magnet 3. For even better results, however, the anti-demagnetization conductors are desirably arranged at the different-polarity interpolar sections, the regions that satisfy the relationship of $0.6 < WB/WM < 1.4$.

Even if anti-demagnetization conductors 7 are arranged in the pole centers, however, a large portion of the opposing magnetic flux corresponding to the power frequency will act upon the outer anti-demagnetization conductors 7 and consequently a large amount of current will flow into the different-polarity interpolar sections, so in terms of anti-demagnetization, a significant effect cannot be expected. In addition, the region where the anti-demagnetization conductors 7 are arranged will be a gap, not the magnetic flux route contributing to output, and will therefore turn out to reduce output. From a perspective of improving demagnetization resistance, the above arrangement does not reduce demagnetization resistance and thus the present embodiment does not rule out the arrangement itself. From a perspective of output, however, it is desirable that no anti-demagnetization conductors 7 be provided at regions other than the different-polarity interpolar sections.

Furthermore, the anti-demagnetization conductors 7, provided to work as a pair, are arranged at symmetrical positions across the line 14 passing from the rotational center of the rotor 2 through the central section of the magnetic pole, and the conductors 7 can conduct equal anti-demagnetization upon the permanent magnets 3 arranged in the magnetic pole.

Furthermore, as shown in FIG. 2, providing the anti-demagnetization conductors 7 on the line heading from the rotational center of the rotor 2 towards the regions at which the outer-circumferential end portions of the permanent magnets 3 and the outer circumference of the rotor 2 become closest to each other enables demagnetization resistance to be increased to a maximum as shown in FIG. 5.

Moreover, as shown in FIG. 4, providing the anti-demagnetization conductors 7 at the positions shifted from the line heading from the rotational center of the rotor 2 towards the regions at which the outer circumference of the rotor 2 and the outer end portions of the permanent magnets 3 become closest to each other enables the amount of rotor core 5 to be increased at the position that the stresses due to the centrifugal force of the permanent magnets are concentrated, and hence strength to be improved.

Besides, since the anti-demagnetization conductors 7 are arranged in such a form as to block the entire region between the outer circumference of the rotor 2 and the outer end portion of each permanent magnet 3, at the different-polarity interpolar region of the rotor core 5 connecting from the pole center to one adjacent different pole, the conductors 7 also contribute to reducing a leakage magnetic flux attempting an escape from the pole center to the adjacent different pole. The leakage magnetic flux is a flux not contributive to output, so making this flux move past the stator will also enable output to be improved.

Figure 6:
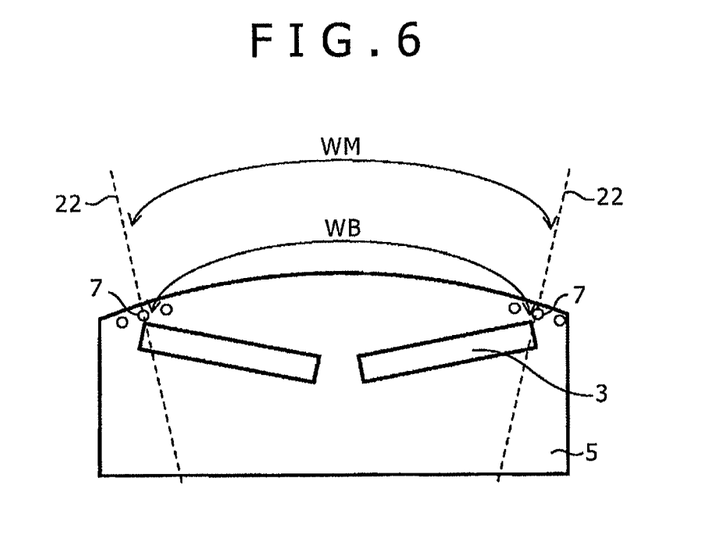
FIG. 6 is an enlarged view showing yet another example of a magnetic pole in a rotor.

The case where one pair of anti-demagnetization conductors 7 only are provided for each magnetic pole has been shown and described in the present embodiment. As shown in FIG. 6, however, for example a plurality of anti-demagnetization conductors 7 may be provided in sets of three pieces for each pole. In this case, the WB described above is defined by two factors. One is a midpoint between the anti-demagnetization conductors 7 at both ends in one set of (in the example of FIG. 6, three) anti-demagnetization conductors, and the other is the angle WB of circumference from the rotational center of the rotor with respect to a midpoint between the anti-demagnetization conductors 7 at both ends in another set of (in the example of FIG. 6, three) anti-demagnetization conductors. This is because, even in the case that the plurality of anti-demagnetization conductor sets are provided for each pole, mainly the anti-demagnetization conductors at both ends in one of the anti-demagnetization conductor sets contribute to counteracting the opposing magnetic flux.

Figure 7:
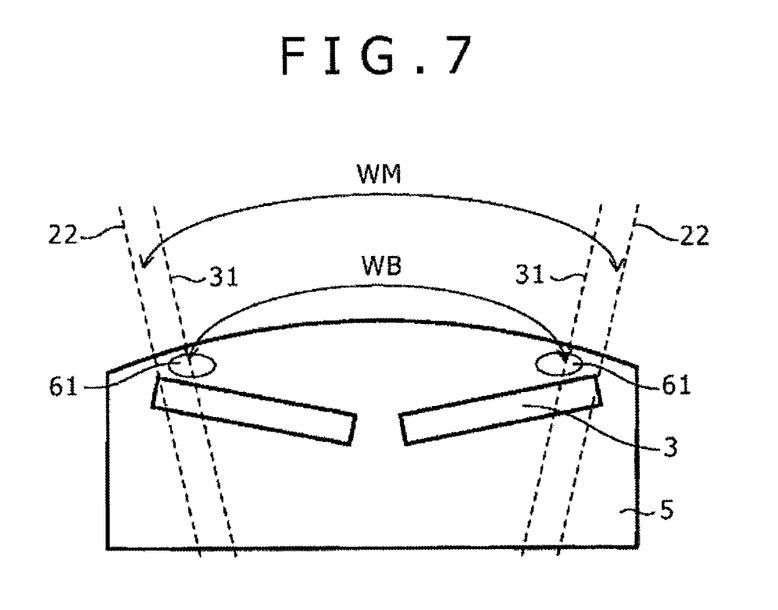
FIG. 7 is an enlarged view showing a further example of a magnetic pole in a rotor.

In addition, the present embodiment has assumed that the shape of the anti-demagnetization conductors in the direction perpendicular to the rotational axis is circular, but the anti-demagnetization conductors can have other shapes. For example as shown in FIG. 7, anti-demagnetization conductors 61 may be of an elliptical shape, instead of the circular shape.

Figure 8:
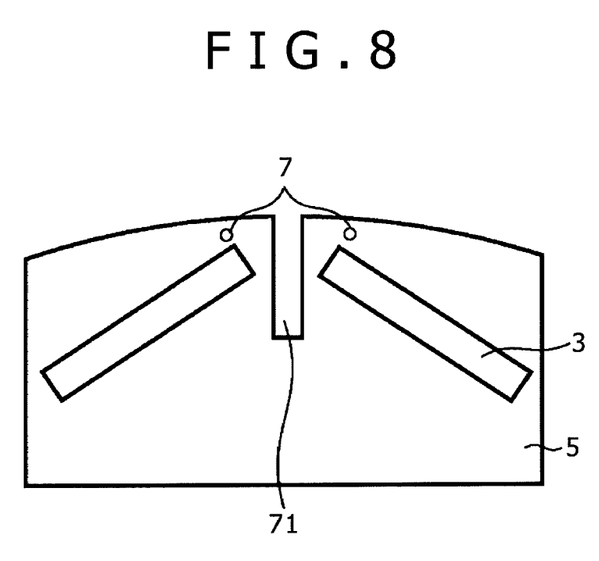
FIG. 8 is an enlarged view showing an interpolar section in a further example of magnetic poles in a rotor.

Furthermore, while in the present embodiment, as shown in FIG. 1, the rotor core 5 has been buried between the permanent magnets 3 in the mutually adjacent magnetic poles, a slot 71 can instead be provided at an interpolar section as shown in FIG. 8.

The electrical rotating machine described in each of the embodiments can be applied as an electric generator connected to a motive power source such as a wind turbine in wind power generation, or as an electric motor used as a motive power source such as a fan or pump.

What is claimed is:

1. An electrical rotating machine comprising:
    a rotating shaft;
    a rotor formed to rotate with rotation of the rotating shaft, the rotor being equipped with permanent magnets;
    a stator disposed in opposed form on an outside-diametral side of the rotor via a clearance with respect to the rotor; and
    anti-demagnetization conductors extending in an axial direction of the rotating shaft, the conductors each being disposed inside the rotor,
    wherein:
    the anti-demagnetization conductors are provided in pairs of two for each of magnetic poles of the rotor to form a pair of anti-demagnetization conductors;
    wherein the pair of anti-demagnetization conductors are electrically interconnected; and
    inside the rotor, the pair of anti-demagnetization conductors are nonuniformly disposed at different-polarity sides of two corresponding permanent magnets in a circumferential direction of the rotor, and are arranged so that one of the pair of anti-demagnetization conductors is more adjacent to the circumference of the rotor than to the permanent magnet.

2. The electrical rotating machine according to claim 1, wherein, inside the rotor, the pair of anti-demagnetization conductors are each disposed at the different-polarity side that is more adjacent to the circumferential direction of the rotor than to an end portion of one of the two corresponding permanent magnets that is close to a central side of the rotor in the circumferential direction thereof, and
    wherein, inside the rotor, the conductors are disposed only at positions external to the end portions of the two corresponding permanent magnets that are closer to a central side of the magnetic pole in the circumferential direction of the rotor.

3. An electrical rotating machine comprising:
    a rotating shaft;
    a rotor formed to rotate with rotation of the rotating shaft, the rotor being equipped with permanent magnets;
    a stator disposed in opposed form on an outside-diametral side of the rotor via a clearance with respect to the rotor; and
    anti-demagnetization conductors extending in an axial direction of the rotating shaft, the conductors each being disposed inside the rotor;
    wherein:
    the anti-demagnetization conductors are provided in pairs of two for each of magnetic poles of the rotor;
    a pair of anti-demagnetization conductors to form a pair are electrically interconnected; and
    the pair of anti-demagnetization conductors are each nonuniformly disposed at a different-polarity interpolar section in the rotor.

4. The electrical rotating machine according to claim 3, wherein:
    the pair of anti-demagnetization conductors are disposed only at the different-polarity interpolar sections in the rotor.

5. The electrical rotating machine according to claim 4, further comprising:
    stator windings, provided on the stator; and
    a power-conditioning system configured to supply an alternating current to each of the stator windings.

6. The electrical rotating machine according to claim 1, wherein:
    the anti-demagnetization conductors provided as a pair are arranged at symmetrical positions with respect to a line passing through a central section of the magnetic pole from a rotational center of the rotor.

7. The electrical rotating machine according to claim 2, wherein:
    the anti-demagnetization conductors provided as a pair are arranged at symmetrical positions with respect to a line passing through a central section of the magnetic pole from a rotational center of the rotor.

8. The electrical rotating machine according to claim 3, wherein:
    the anti-demagnetization conductors provided as a pair are arranged at symmetrical positions with respect to a line passing through a central section of the magnetic pole from a rotational center of the rotor.

9. The electrical rotating machine according to claim 4, wherein:
    the anti-demagnetization conductors provided as a pair are arranged at symmetrical positions with respect to a line passing through a central section of the magnetic pole from a rotational center of the rotor.

10. The electrical rotating machine according to claim 1, wherein:
    the anti-demagnetization conductors provided as a pair are arranged so that the permanent magnets are positioned at an inner-diametral side of the rotor relative to at least one of an arc connecting the conductors to each other in an outer-circumferential direction of the rotor, and a line created by extending the arc in the outer-circumferential direction of the rotor.

11. The electrical rotating machine according to claim 2, wherein:
    the anti-demagnetization conductors provided as a pair are arranged so that the permanent magnets are positioned at an inner-diametral side of the rotor relative to at least one of an arc connecting the conductors to each other in an outer-circumferential direction of the rotor, and a line created by extending the arc in the outer-circumferential direction of the rotor.

12. The electrical rotating machine according to claim 3, wherein:
    the anti-demagnetization conductors provided as a pair are arranged so that the permanent magnets are positioned at an inner-diametral side of the rotor relative to at least one of an arc connecting the conductors to each other in an outer-circumferential direction of the rotor, and a line created by extending the arc in the outer-circumferential direction of the rotor.

13. The electrical rotating machine according to claim 4, wherein:
    the anti-demagnetization conductors provided as a pair are arranged so that the permanent magnets are positioned at an inner-diametral side of the rotor relative to at least one of an arc connecting the conductors to each other in an outer-circumferential direction of the rotor, and a line created by extending the arc in the outer-circumferential direction of the rotor.

14. The electrical rotating machine according to claim 7, wherein:
the anti-demagnetization conductors are each provided on a line heading from the rotational center of the rotor, towards a region at which an outer circumference of the rotor and an outer end portion of one of the two corresponding permanent magnets become closest to each other.

15. The electrical rotating machine according to claim 7, wherein:
in an inter-magnetic-pole section, the anti-demagnetization conductors are each provided at a position shifted from a line heading from the rotational center of the rotor, towards a region at which an outer circumference of the rotor and an outer end portion of one of the two corresponding permanent magnets become closest to each other.

16. The electrical rotating machine according to claim 1, wherein:
the anti-demagnetization conductors are each arranged in such a form as to block, at a different-polarity interpolar section, a region between an outer circumference of the rotor and an outer end portion of one of the two corresponding permanent magnets formed so as to extend from a magnetic pole central section to a neighborhood of the different-polarity interpolar section.

17. The electrical rotating machine according to claim 2, wherein:
the anti-demagnetization conductors are each arranged in such a form as to block, at a different-polarity interpolar section, a region between an outer circumference of the rotor and an outer end portion of one of the two corresponding permanent magnets formed so as to extend from a magnetic pole central section to a neighborhood of the different-polarity interpolar section.

18. The electrical rotating machine according to claim 3, wherein:
the anti-demagnetization conductors are each arranged in such a form as to block, at the different-polarity interpolar section, a region between an outer circumference of the rotor and an outer end portion of one of the two corresponding permanent magnets formed so as to extend from a magnetic pole central section to a neighborhood of the different-polarity interpolar section.

19. The electrical rotating machine according to claim 4, wherein:
the anti-demagnetization conductors are each arranged in such a form as to block, at the different-polarity interpolar section, a region between an outer circumference of the rotor and an outer end portion of one of the two corresponding permanent magnets formed so as to extend from a magnetic pole central section to a neighborhood of the different-polarity interpolar section.

20. The electrical rotating machine according to claim 1, wherein, the pair of anti-demagnetization conductor are placed in a position satisfying $0.6<WB/WM<1.4$,
wherein WM is as of an angle of a line connecting between a rotation center axis and a permanent magnet outer peripheral corner portion facing to an interpolar portion of one pole, and WB is an angle of circumference between the anti-demagnetization conductors.

21. The electrical rotating machine according to claim 3, wherein, the pair of anti-demagnetization conductor are placed in a position satisfying $0.6<WB/WM<1.4$,
wherein WM is as of an angle of a line connecting between a rotation center axis and a permanent magnet outer peripheral corner portion facing to an interpolar portion of one pole, and WB is an angle of circumference between the anti-demagnetization conductors.

* * * * *